July 4, 1961 B. WANDEL 2,991,334

SHOULDER SUPPORT FOR A TELEPHONE

Filed Sept. 18, 1958

INVENTOR.
BRONISLAW WANDEL
BY Elgin D. Lost
ATTORNEY

United States Patent Office 2,991,334

Patented July 4, 1961

2,991,334

SHOULDER SUPPORT FOR A TELEPHONE

Bronislaw Wandel, 18 Hancock St., Boston, Mass.

Filed Sept. 18, 1958, Ser. No. 761,761

5 Claims. (Cl. 179—157)

The present invention relates to shoulder support devices for telephone apparatus and in particular to a combination of such a device and a magnifying lens to assist in reading finely printed or written matter.

An example of the embodiment to which the invention is applicable is shown in United States Patent 2,762,868, issued September 11, 1956. Shoulder support devices generally may be positioned on the transmitter-receiver unit of a hand set type telephone to provide for freedom of movement of the hands of the user to perform other functions while using the telephone apparatus. As a result, efficiency of office, clerical or professional persons has been enhanced.

It is an object of the present invention to provide in a telephone support attachment means for magnification of reading matter.

It is a further object of the invention to provide in a unitary structure a shoulder support attachment for a telephone hand set and a magnifying lens.

The objects, advantages and features of the invention will be readily appreciated after consideration of the following detailed specification and appended drawings, in which.

Figure 1:
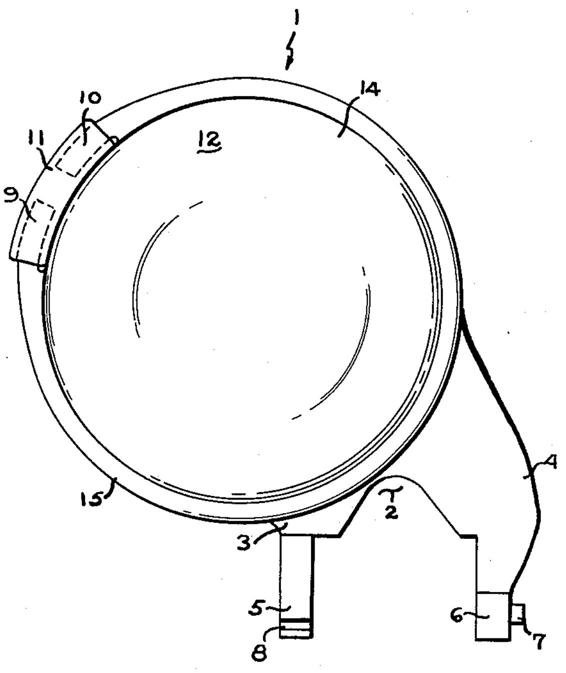
FIG. 1 is a side elevation of the embodiment of the invention.
Figure 2:
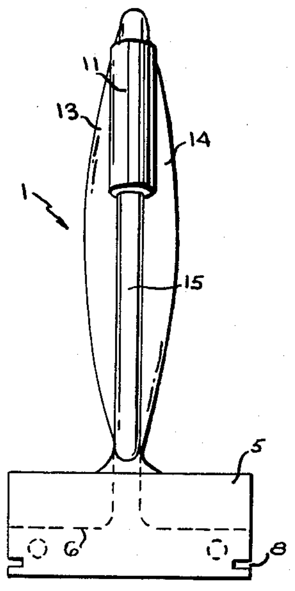
FIG. 2 is a front elevation.
Figure 3:
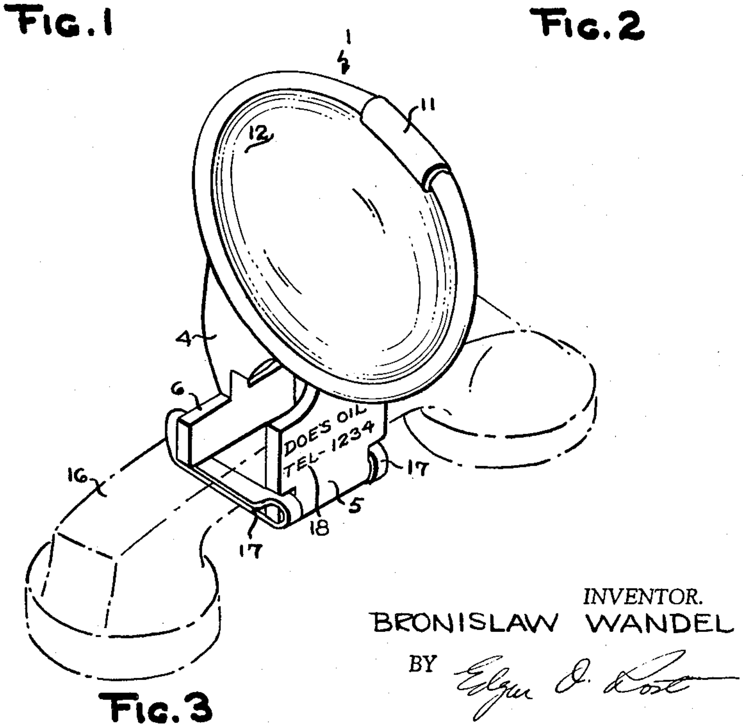
FIG. 3 is a perspective view showing the embodiment mounted in its desired position on a telephone transmitter-receiver unit.

Referring to the drawings the embodiment of the invention comprises a main body member 1 fabricated in a substantially circular configuration from a transparent material such as Lucite or any other similar plastic material. Along one edge of the body member 1 an opening 2 is provided to conform to the configuration of the telephone apparatus on which it is to be mounted. As shown in FIG. 1, the opening 2 will conform to all shapes of transmitter-receiver units commonly employed in present day telephones. With opening 2 provided therein, a pair of arms 3 and 4 are defined to which are attached holding members 5 and 6. To facilitate mounting of the support attachment on the telephone unit in the manner to be hereinafter described slots 8 are provided in member 5 and pins 7 are provided in member 6. The holding members 5 and 6 have been selected with flat surfaces in order that any desirable advertising literature may be printed on the face of member 6 as shown at 18. By elimination of this advertising matter or transference of same to another portion of the body member, it may be possible to use transverse holding members similar to those shown in the aforementioned patent.

Along the outer peripheral edge of body member 1, opposed fingers 9 and 10 provide means for support of a short length of rubber tubing 11. The tubing 11 will contact the shoulder of the user when the attachment is utilized as a shoulder support.

In accordance with the invention, I provide a magnifying lens 12 as an integral part of member 1 within the circular portion by means of convex surfaces 13 and 14. The edge of the lens will be substantially flat as at 15. The lens may be formed simply by molding the plastic material at the time of fabrication or grinding afterwards.

The embodiment of the invention is mounted on a transmitter-receiver unit 16 of a telephone hand set simply by positioning the opening 2 over the shank. Elastic bands 17 are then stretched between pins 7 and slots 8 with the intermediate portion of the bands engaging the underside of the shank. The holding member 6 will be positioned to face the user and it will be advantageously utilized to provide advertising literature 18 thereon. In the usage of the embodiment, the unit 16 is removed and the lens 12 may be held over the printed or written matter to be read, for example numbers in a telephone book. Then with the other hand the desired number may be dialed. The telephone unit may then be positioned and supported by utilizing the shoulder support features of the embodiment to thereby free the hands of the user for other uses.

While I have described an illustrative embodiment, various modifications or alterations will occur to skilled artisans, such as changes in the lens portion to other configurations or surfaces found in the art. It is my intention to cover in the appended claims such modifications or alterations as fall within the spirit and scope of the invention.

What is claimed is:

1. A shoulder support adapted for mounting on a telephone transmitter-receiver unit comprising a main body member of a transparent material having a pair of spaced arms extending therefrom to define an opening therebetween, holding members appended to said arms, said main body member defining convex surfaces on opposite sides to form a magnifying lens for reading printed matter.

2. A shoulder support adapted for mounting on a telephone transmitter-receiver unit comprising a main body member of a transparent material having a pair of spaced arms extending therefrom to define an opening therebetween, holding members appended to said arms, said main body member defining over a major portion of its cross-sectional area a magnifying lens for use in reading printed matter.

3. A shoulder support adapted for mounting on a telephone transmitter-receiver unit comprising a main body member of a transparent plastic material having a pair of spaced arms extending therefrom to define an opening therebetween, holding members appended to said arms, said main body member defining over a major portion of its cross-sectional area a circular magnifying lens for reading printed matter.

4. A shoulder support adapted for mounting intermediate the ends of a telephone transmitter-receiver unit comprising a body member of a transparent plastic material having a main circular portion and a pair of spaced arms defining therebetween an opening dimensioned to straddle the shank of said telephone unit, holding members appended to said arms, said main circular body portion having convex surfaces oppositely disposed to form a magnifying lens for reading purposes.

5. A shoulder support adapted for mounting on the shank of a telephone transmitter-receiver unit comprising a body member of a transparent plastic material having a main circular portion and a pair of spaced arms defining therebetween an opening to straddle said shank, holding members of a similar material appended to said arms, said main circular body portion defining a bi-convex magnifying lens for reading purposes.

No references cited.